United States Patent
D'Aveta et al.

(10) Patent No.: US 9,521,157 B1
(45) Date of Patent: Dec. 13, 2016

(54) IDENTIFYING AND ASSESSING MALICIOUS RESOURCES

(71) Applicant: Bank of America Corporation, Charlotte, NC (US)

(72) Inventors: Robert D'Aveta, Huntersville, NC (US); Chris Camacho, Springfield, VA (US)

(73) Assignee: Bank of America Corporation, Charlotte, NC (US)

( * ) Notice: Subject to any disclaimer, the term of this patent is extended or adjusted under 35 U.S.C. 154(b) by 1 day.

(21) Appl. No.: 14/748,493

(22) Filed: Jun. 24, 2015

(51) Int. Cl.
*H04L 29/06* (2006.01)
*H04L 29/08* (2006.01)
*G06F 17/30* (2006.01)

(52) U.S. Cl.
CPC ..... *H04L 63/1416* (2013.01); *G06F 17/30598* (2013.01); *G06F 17/30887* (2013.01); *H04L 63/0236* (2013.01); *H04L 67/02* (2013.01)

(58) Field of Classification Search
CPC .. H04L 63/1416; H04L 63/0236; H04L 67/02; G06F 17/30598; G06F 17/30887
USPC .......................................................... 726/23
See application file for complete search history.

(56) References Cited

U.S. PATENT DOCUMENTS

| | | | | |
|---|---|---|---|---|
| 8,566,928 B2* | 10/2013 | Dagon | ............... | H04L 29/12066 726/22 |
| 8,769,692 B1* | 7/2014 | Muttik | ................ | H04L 63/1416 726/22 |
| 8,892,687 B1* | 11/2014 | Call | .................. | H04L 29/06972 707/756 |
| 9,244,903 B2* | 1/2016 | Huang | ................ | G06F 17/2705 |
| 2004/0260922 A1* | 12/2004 | Goodman | ............ | G06Q 10/107 713/154 |

(Continued)

OTHER PUBLICATIONS

Cisco Systems, Inc., 'Cisco AsyncOS 8.5.6 for Email User Guide', Jul. 4, 2014, Cisco Systems, Inc., pp. 1-32, 9-51, 9-73-9-76, 15-7,8, http://www.cisco.com/c/dam/en/us/td/docs/security/esa/esa8-5-6/ESA_8-5-6_User_Guide.pdf.*

(Continued)

*Primary Examiner* — Luu Pham
*Assistant Examiner* — Ronald Baum
(74) *Attorney, Agent, or Firm* — Banner & Witcoff, Ltd.; Michael A. Springs

(57) ABSTRACT

Methods, systems, and computer-readable media for analyzing and indicating network resources as potentially malicious are disclosed. Some aspects of the disclosure provide ways for threat-analyzing individuals and/or organizations to transmit information about potentially malicious resources in a safe manner. Users or computing devices may transmit non-resolvable "de-fanged" resource identifiers, which lessens the likelihood that the receiving computing device will download malicious data or applications from the resource. Some aspects disclosed herein provide ways to correctly and accurately "re-fang" the resource identifier for threat analysis of the resource, for example by selecting one or more re-fangers to apply and applying the re-fangers to the identifier. Data may be retrieved from the resource (for example via a headless or non-interactive browser), and the resource and/or resource identifier may be categorized as malicious. Indications of a resource as malicious may be transmitted to other computing devices to reduce or eliminate malicious activity.

14 Claims, 6 Drawing Sheets

(56) References Cited

U.S. PATENT DOCUMENTS

| | | | | |
|---|---|---|---|---|
| 2007/0079379 A1* | 4/2007 | Sprosts | ............... | G06Q 10/107 |
| | | | | 726/24 |
| 2009/0083854 A1* | 3/2009 | Bozanich | ............ | H04L 63/1433 |
| | | | | 726/23 |
| 2012/0180135 A1* | 7/2012 | Hodges | .................. | G06Q 10/10 |
| | | | | 726/26 |
| 2013/0254855 A1* | 9/2013 | Walters | ................... | G06F 21/60 |
| | | | | 726/5 |
| 2014/0282908 A1* | 9/2014 | Ward | ................... | H04W 12/12 |
| | | | | 726/4 |
| 2014/0310811 A1* | 10/2014 | Hentunen | ........... | H04L 63/1441 |
| | | | | 726/23 |
| 2015/0106156 A1* | 4/2015 | Chang | ................ | G06Q 30/0201 |
| | | | | 705/7.29 |

OTHER PUBLICATIONS

Colford, P., 'Where-do-I-report-a-browser-lockup-caused-by-fake-tech-support-website', OpenDNS Blog, Aug. 15, 2015, entire page, https://support.opendns.com/entries/95841987-Where-do-I-report-a-browser-lockup-caused-by-fake-tech-support-website-.*

* cited by examiner

URL(s) to Crawl

401 meow://badsite[.]com/order.php
402 hola://www{.}domain{.}com/foo.bar
403 DELETEhttpCOLONSLASHSLASHwwwDOTdomiannnameDOTcomSLASHgo.php

Geo Location

404 Landing Page - US

405 Results Delivery: first.last@domain.com

Crawl!

FIG. 4A

URL(s) to Crawl

411 http://badsite.com/order.php
412 http://www.domain.com/foo.bar
413 http://www.domiannname.com/go.php

Geo Location

404 Landing Page - US

405 Results Delivery: first.last@domain.com

Crawl!

FIG. 4B

Report for: http://www.domain.com/foo.bar

500

Crawl Overview

Pages: 1
Languages: unknown

Risk: Binaries:
Spam: DriveBy:

Crawl Start Page: http://www.domain.com/foo.bar
Crawl End Page: http://www.domain.com/foo.bar Phishing:
Blacklist:

Blacklist Incidents

Blacklisted Page
URL: http://www.domain.com/foo.bar
IP: xxx.xxx.xxx.xxx
Seq #: 1

Blacklist Trigger Page
URL: http://www.domain.com/foo.bar
IP: xxx.xxx.xxx.xxx
Seq #: 1

Previous Page: application/x
 mdownload

Blacklist Info:
Type: application/x
 mdownload

Binary Incidents

Detected File
MD5: XXXXXXXXXXXXXXXX
Detected: 2015-YY-YY
Type: Type 1

URL: http://www.domain.com/foo.bar

AV Classifications:
 * Classification 1
 * Classification 2
 * Classification 3

FIG. 5

IDENTIFYING AND ASSESSING MALICIOUS RESOURCES

FIELD

Aspects of the disclosure relate to computer hardware and software. In particular, one or more aspects of the disclosure generally relate to computer hardware and software for assessing and categorizing network-based threats, including assessing and categorizing malicious resources such as malicious websites.

BACKGROUND

Users are increasingly turning to online resources to shop, bank, and perform other financial transactions. Many customers of organizations, such as financial institutions, use online portals provided by the organizations to interact with the organizations. These portals include online websites, applications such as applications for mobile devices, e-mail addresses which send account information to users, and the like.

Where a customer has a trusting relationship with an organization, such as with their financial institution, the customer may make e-mails, websites, or applications purporting to be from their financial institution to be trustworthy and of high priority to the customer. With respect to some institutions and organizations, such as financial institutions, customers may be likely to follow the instructions in the content, as the customer has a strong interest in their finances and the fiduciary relationship between a customer and their financial institution is one of trust.

Malicious individuals and organizations have sought to prey on limited customer technical savviness and the trust between a customer and a reputable organization with which the customer interacts. A common technique is the deployment of websites, electronic mail, or mobile applications designed to appear as though they are from a legitimate source. These so-called "phishing" resources may appear on the surface to be a legitimate website. In some cases, they may have the same "look-and-feel" as a well-known website, such as a banking or retail website. However, when a user types in personal identification information, the information is routed to a malicious entity for various illicit or nefarious purposes, such as improper and unauthorized withdrawal of funds from an account.

Customers of institutions may be victims of such "phishing," which may erode the customer's trust with the organization. To prevent "phishing," institutions may employ a threat assessment team who review security threats and assist in issuing security alerts to minimize exposure and raise awareness of potentially malicious hardware, software, or the like.

Malicious organizations and individuals entities frequently deploy nefarious hardware, software, and the like at multiple physical sites and/or create multiple identifiers (e.g. Uniform Resource Identifiers (URIs), Uniform Resource Locators (URLs), domain names, IP addresses, e-mail addresses, or the like). Once exposed via detection and issuance of a security alert, the malicious actors may be forced to discard or abandon the hardware and software resources at one or more physical or virtual locations.

SUMMARY

Given the importance of online transactions, and considering that an increasing number of transactions may be partially or completely conducted over less-secure networks such as public wireless "hotspots," it may be useful and important for an organization and its computer systems to quickly detect malicious resources and categorize such resources as being malicious so that appropriate remediation actions may be performed.

Also of importance, however, is that a categorizing entity protects its own assets, resources, and systems. Acquired information about a potentially malicious source may need to be shared among individuals, computing devices, systems, organizations, and so on. For example, threat information intake may be performed by one or more customer service representatives. These representatives may perform other duties, such as responding to benign customer service requests (e.g. account status requests, order status requests, trade fulfillment requests, transaction assistance requests, or the like). In some situations, agents may be social-media oriented and may post, receive, or share information on social media platforms, or the like. These and other customer-facing agents, including automated or computerized agents, may be trained or programmed to pass on threat information to one or more threat analyzing teams, individuals, computing devices, or the like.

Additionally or alternatively, an institution may be a member of a threat analysis community, either explicitly or under an informal agreement between institutions to share information to act in the best interests of their individual customers and society at large. When one member of the community receives information, it may be expected to pass the information along to analysts at other firms, organizations, or the like.

An identifier, such as a URL, passed between one organization's teams, individuals, computing devices, agents and analysts, or the like, or between one institution and a second institution, may identify a location or device at which malicious data may be downloaded or from which malicious software may be installed. Even in a threat assessment environment, training of analysts and agents alone may be insufficient to protect against infection of threat assessment equipment. An errant click by an analyst or agent of a potentially malicious URL, link, or other identifier may result in infection of a computing resource.

Accordingly, users or computing devices may de-fang the link, URL, identifier, or the like by performing one or more modifications to the identifier which may make the identifier, or the location identified by the "fanged" identifier, unresolvable, unclickable, inaccessible, or the like. The de-fanged link or identifier may be passed freely between agents, analysts, computing devices and systems, and so on with minimal risk that the users or equipment will be infected or otherwise compromised. Once transmitted to the receiving threat analyst individual, team, and/or computing device, a de-fanged URL may need to be re-fanged, and restored to its original state for analysis and classification.

However, agents, analysts, and computer devices and systems are non-uniform in their methods of de-fanging a URL. One analyst may de-fang by modifying a protocol indicator of a URL, a second analyst may de-fang by replacing or modifying delimiters in the URL, and a third analyst may de-fang by adding text to the URL. Each of these analysts may transmit their found malicious identifiers to a fourth analyst, who may need to re-fang each site for further processing, categorization, transmission, or the like.

Accordingly, one or more aspects of the present disclosure provide methods that include receiving, at a computing device and via a user interface, a string of text including a de-fanged uniform resource locator. The computing device may convert the de-fanged uniform resource locator into a resolvable uniform resource locator and may retrieve data from a network location identified by the resolvable uniform resource locator. Retrieving the data may include instantiating a headless browser and rendering the data via the headless browser, resulting in rendered data. The computing device may categorize, based on the rendered data, the location as a malicious location.

In some aspects, reversion of a URL to its original presentation, or reversion from a de-fanged URL to a re-fanged URL may be performed without further input from the user and prior to instantiation of a crawler or crawling engine to access the resource identified by the location.

BRIEF DESCRIPTION OF THE DRAWINGS

The present disclosure is illustrated by way of example and not limited in the accompanying figures in which like reference numerals indicate similar elements and in which:

FIGS. 4A and 4B depict an illustrative graphical user interface in which malicious identifiers may be input in accordance with one or more example embodiments;

FIG. 5 depicts an illustrative output of a specially-programmed analyzing device in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
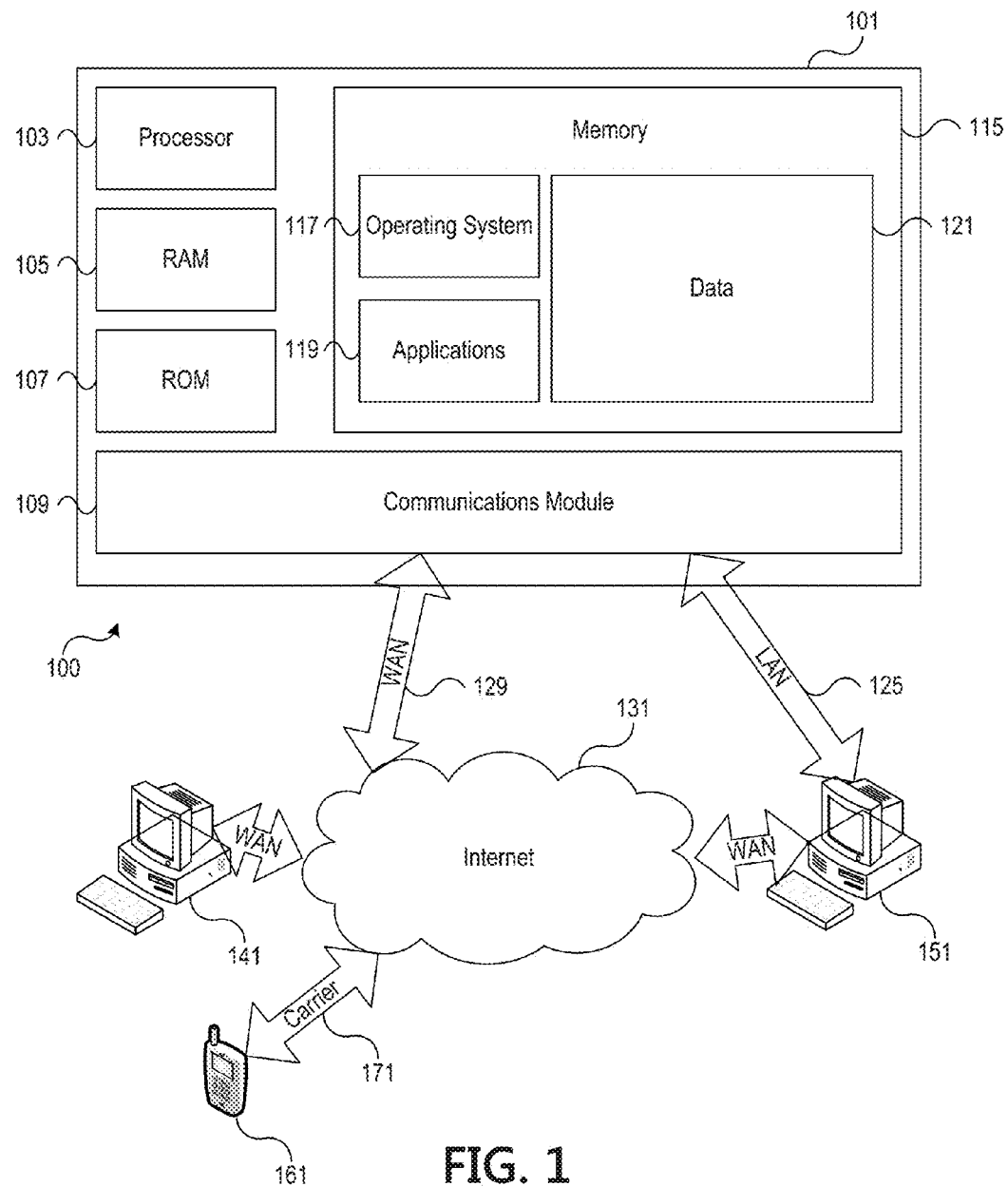
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
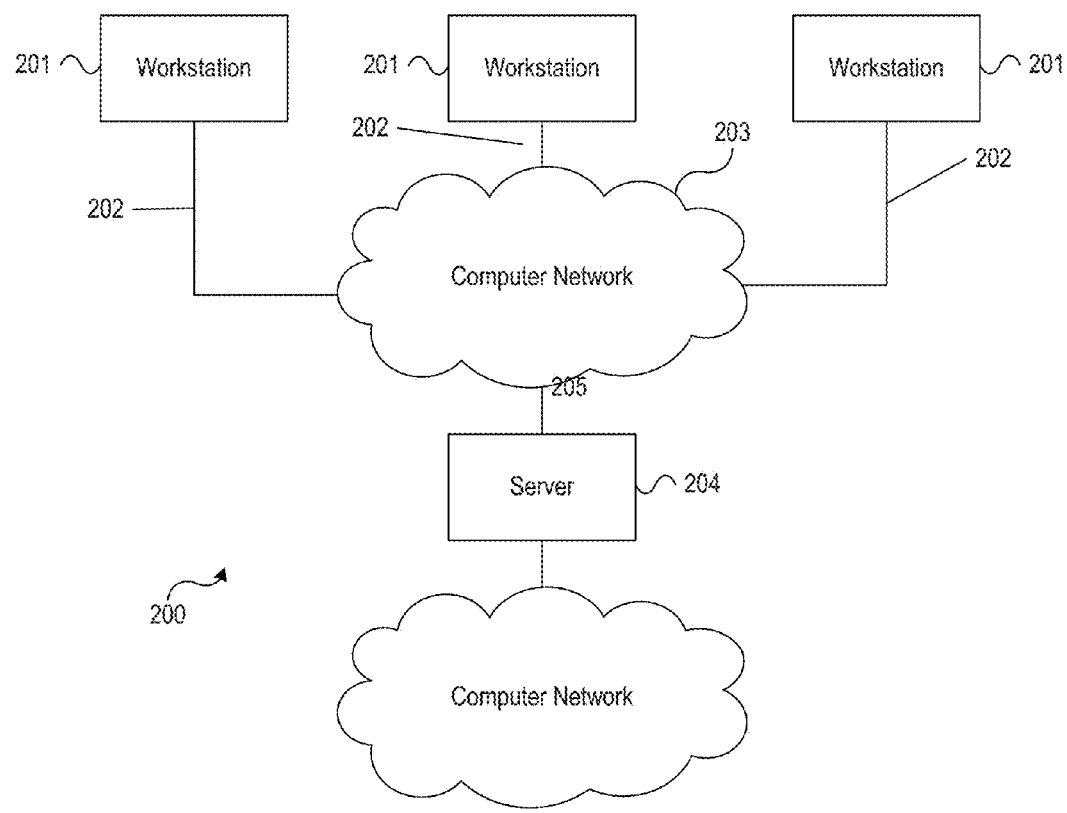
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
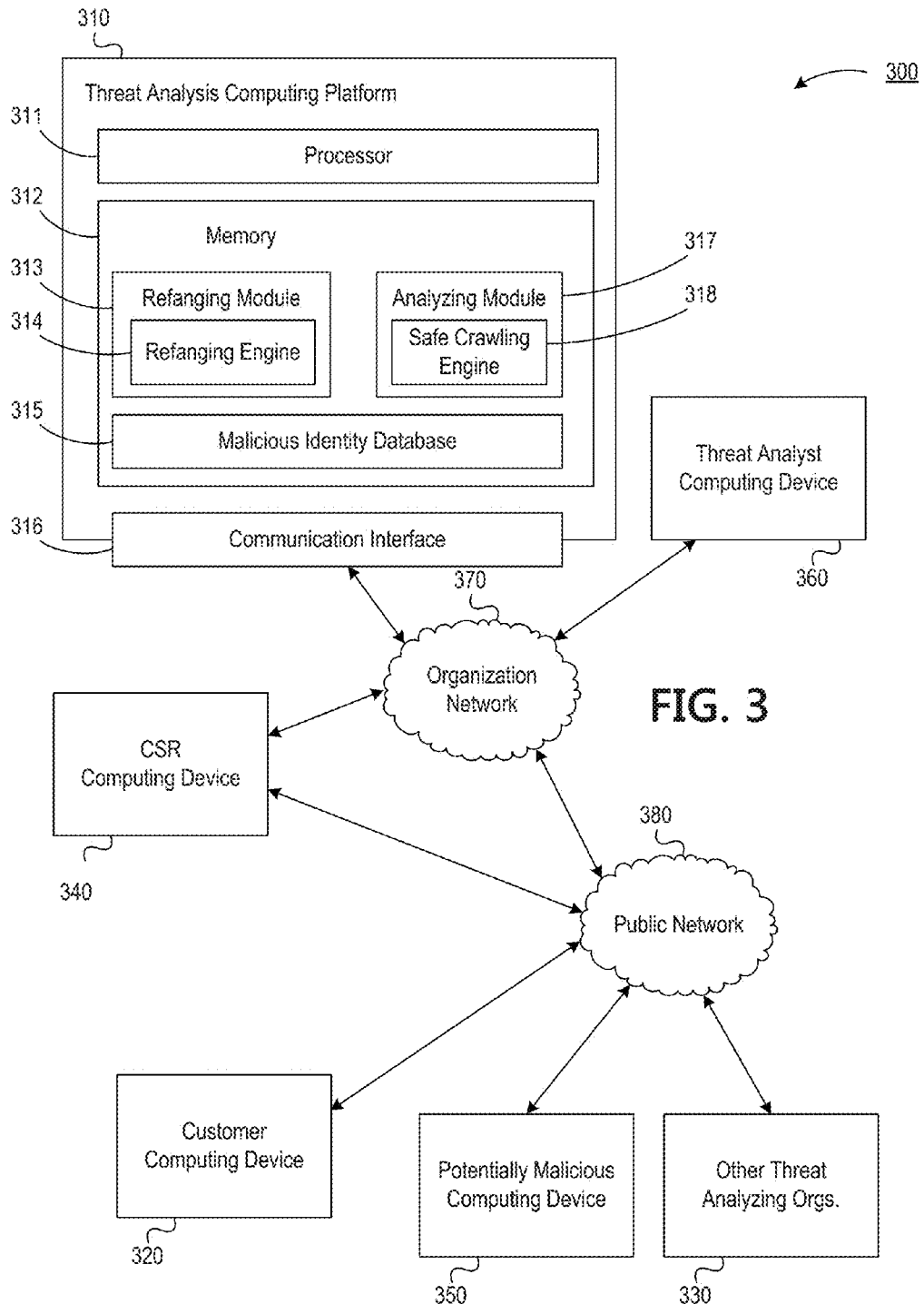
FIG. 3 depicts an illustrative computing environment for analyzing threats and transmitting and receiving information to customers, agents, analysts, or the like in accordance with one or more example embodiments.

FIG. 3 depicts an illustrative computing environment for analyzing potential computing devices and/or resources as malicious and receiving and transmitting threat information to and from customers, agents, other analysts, and the like in accordance with one or more example embodiments. Referring to FIG. 3, computing environment 300 may include one or more computing devices, including a customer computing device 320, a customer service representative (CSR) computing device 340, a threat analyst computing device 360, and an unanalyzed potentially malicious computing device 350, which may be determined to be actually a malicious computing device according to one or more aspects discussed elsewhere.

Customer computing device 320 may, for example, be used by and/or configured to be used by a customer of an organization, such as a particular customer of a financial institution, and may be a mobile device or non-mobile device. In some aspects, a customer may have more than one customer computing device 320 with which they interact with other computing devices and systems and components and subcomponents thereof. In some aspects, customer computing device 320 may be shared by one or more customers of the organization.

CSR computing device 340 may, e.g., be used by an agent of an organization, such as a customer-facing agent tasked with responding to customer requests regarding account status, information, inquiries, promotions, or the like. Such requests may be received at CSR computing device 340 in any of a number of formats, including video messaging, text messaging, two-way messaging (e.g. instant or chat messaging), voice (e.g. by way of a telephone, VoIP, or other like voice-carrying formats), e-mail, or the like. Such customer requests or messages may be received at CSR computing device 340 from customer computing device 320 via a public network 380 individually or in conjunction with an organization network 370. In some aspects, CSR computing device 340 also may include a terminal device (which may, e.g., be used by a local agent of an organization in a retail location of the organization, such as by a bank teller of a financial institution who is located in a banking center of the financial institution).

Threat analyst computing device 360 may, e.g., be used by an agent or analyst of an organization, such as an analyst tasked with reviewing, investigating, and/or further investigating threats, malicious activity, malicious resources, or the like. Such tasks may be received at threat analyst computing device 360 in any of a number of formats, including video messaging, text messaging, two-way messaging (e.g. instant or chat messaging), voice (e.g. by way of a telephone, VoIP, or other like voice-carrying formats), e-mail, or the like. Such tasks may be received from CSR computing device 340 or from customer computing device 320 via a public network 380 individually or in conjunction with an organization network 370.

Computing environment 300 also may include computing devices of other threat analyzing organizations 330 which may include one or more computers (e.g., laptop computers, desktop computers, servers, server blades, or the like).

As noted above, and as illustrated in greater detail below, any and/or all of customer computing device 320, computing devices/systems of other threat analyzing organizations 330, and CSR computing devices 340 be special-purpose computing devices configured to perform specific functions.

Computing environment 300 also may include one or more computing platforms. For example, computing environment 300 may include threat analysis computing platform 310. Threat analysis computing platform 310 may include one or more special-purpose or specially-programmed computing devices configured to perform one or more of the functions described herein. For example, threat analysis computing platform 310 may include one or more computers (e.g., laptop computers, desktop computers, servers, server blades, or the like).

Computing environment 300 also may include one or more networks, which may interconnect one or more of threat analysis computing platform 310, customer computing device 320, CSR computing device 340, computing devices/systems of other threat analyzing organizations 330, CSR computing device 340, threat analyst computing device 360, and potentially malicious computing device 350. For example, computing environment 300 may include organization network 370 and public network 380. Organization network 370 and/or public network 380 may include one or more sub-networks (e.g., LANs, WANs, or the like). Organization network 370 may be associated with a particular organization (e.g., a corporation, financial institution, educational institution, governmental institution, or the like) and may interconnect one or more computing devices associated with the organization. For example, threat analysis computing platform 310, threat analyst computing device 360, and CSR computing device 340 may be associated with an organization (e.g., a financial institution), and organization network 370 may be associated with and/or operated by the organization, and may include one or more networks (e.g., LANs, WANs, VPNs, or the like) that interconnect threat analysis computing platform 310, threat analyst computing device 360, and CSR computing device 340 and one or more other computing devices and/or computer systems that are used by, operated by, and/or otherwise associated with the organization. Public network 380 may connect organization network 370 and/or one or more computing devices connected thereto (e.g., threat analysis computing platform 310, threat analyst computing device 360, CSR computing device 340) with one or more networks and/or computing devices that are not associated with the organization. For example, customer computing device 320, computing devices of other threat analyzing organizations 330, and potentially malicious computing device 350 might not be associated with an organization that operates organization network 370 (e.g., because customer computing device 320, computing devices of other threat analyzing organizations 330, and potentially malicious computing device 350 may be owned and/or operated by one or more entities different from the organization that operates organization network 370, rather than being owned and/or operated by the organization itself or an employee or affiliate of the organization), and public network 380 may include one or more networks (e.g., the internet) that connect customer computing device 320, computing devices of other threat analyzing organizations 330, and potentially malicious computing device 350 to organization network 370 and/or one or more computing devices connected thereto (e.g., threat analysis computing platform 310, threat analyst computing device 360, CSR computing device 340).

Threat analysis computing platform 310 may include one or more processors 311, memory 312, and communication interface 316. A data bus may interconnect processor(s) 311, memory 312, and communication interface 316. Communication interface 316 may be a network interface configured to support communication between threat analysis computing platform 310 and organization network 370 and/or one or more sub-networks thereof. Memory 312 may include one or more program modules having instructions that when executed by processor(s) 311 cause threat analysis computing platform 310 to perform one or more functions described herein and/or one or more databases that may store and/or otherwise maintain information which may be used by such program modules and/or processor(s) 311. For example, memory 312 may include re-fanging module 313, which may include instructions that when executed by processor(s) 311 cause threat analysis computing platform 310 to perform one or more functions described herein, such as instructions for removing de-fanging characteristics of a resource identifier and/or generating a re-fanged identifier, as illustrated in greater detail below. For instance, re-fanging module 313 may include executable instructions for and/or otherwise provide a re-fanging engine 314, which may be used in generating and/or applying one or more re-fanging entities (which may, e.g., be used to remove de-fanging characteristics of a resource identifier and/or generate a re-fanged identifier, as illustrated in greater detail below).

In addition, memory 312 may include analyzing module 317, which may include instructions that when executed by processor(s) 311 cause threat analysis computing platform 310 to perform one or more functions described herein, such as instructions for performing a determination as to whether a re-fanged resource identifier is malicious, and transmitting threat information to one or more interested individuals, organizations, parties, or the like, as illustrated in greater detail below. For instance, analyzing module 317 may include executable instructions for and/or otherwise provide a safe crawling engine 318, which may be used in instantiating one or more non-graphical instances (e.g. text-only instances, non-displayed instances, headless instances) of a browser or other resource accessor, directing the resource accessor to a location identified by the re-fanged resource identifier, and generating a message with threat-assessment information based on one or more characteristics of the accessed location.

In addition, memory 312 may include a malicious identity database 315, which may store information identifying one or more previously generated re-fanged resource identifiers and/or information associated with or identifying data retrieved based on one or more re-fanged resource identifiers and/or other information used by threat analysis computing platform 310, re-fanging module 313 and/or re-fanging engine 314, and/or analyzing module 317 and/or safe crawling engine 318, as illustrated in greater detail below.

FIGS. 4A and 4B depict an exemplary user interface 400 according to one or more aspects of the present disclosure. FIG. 4A illustrates a user interface with URLs in a de-fanged state, and FIG. 4B illustrates the user interface with URLs in a re-fanged or "fanged" state. As discussed above, and as illustrated by resource identifiers 401, 402, and 403 (which in this example are URLs) in FIG. 4A, threat assessment analysts may engage in formal or informal de-fanging practices to minimize the probability of installation or downloading of malicious resources. According to one or more aspects of the present disclosure, a specially programmed computing device may be tasked with applying one or more re-fangers to a de-fanged identifier to result in a re-fanged identifier, as illustrated with re-fanged resource identifiers 411, 412, and 413.

A de-fanging practice may be to "break" an identifier, such as a URL, so that it might not be resolvable by a computing device. For example, a common web protocol is the HyperText Transport Protocol, or HTTP. A common uniform resource locator (URL) scheme may begin an address with a protocol indicator http:// to denote the address is an HTTP address. In order to prevent a URL from being resolved as an HTTP address, a user or computing device may add to, subtract from, or replace the characters in 'http' with other characters. For example, 'http' may be transformed into 'hxxp,' 'hmmp,' 'hola,' 'meow,' 'deletemehttp,' 'htt,' or the like.

Another de-fanging practice may be to add, delete, or modify delimiters to avoid resolution of the URL. For example, a website may be located at a resource identified by the URL http://www.website.com. To avoid resolution of this URL, a user or computing device may replace the dots (.) with other characters, or may modify the dots with other characters. For example, 'www.website.com' may be transformed into 'wwwDOTwebsiteDOTcom" or "www[.]website[.]com" or "www{.}website{.}com" or "wwwPERIODwebsitePERIODcom" or the like.

De-fanging of other resource identifiers may also occur. For example, a de-fanging practice for an e-mail address may be to replace an "@" symbol with an AT, so that an e-mail address of "malicioususer@maliciouswebsite.com" may be de-fanged as "malicioususer ATmaliciouswebsite.com."

In some aspects, multiple different de-fanging practices may be used. To continue with the example above of the "malicioususer@maliciouswebsite.com" e-mail address, a de-fanger may replace the @ symbol and the "." to result in "malicioususerATmaliciouswebsiteDOTcom"

Another de-fanging practice may be to modify the top-level domain (the ".com" part of a URL) so that it is unresolvable. For example, a de-fanged version of "maliciouswebsite.com" may be "maliciouswebsite.comREMOVEME"

Re-fanging an identifier may include the removal, replacement, re-constitution, or the like of additions or modifications made by a user and/or a computing device to generate a de-fanged identifier. As discussed above, such modifications might not be uniform, and as such, one or more re-fangers may be created automatically, deterministically, programmatically, manually, or the like, including via the deployment of statistical analysis of one or more de-fanged resource identifiers.

In some aspects, as discussed above, the re-fanging engine may determine that one or more re-fangers may need to be applied to the resource identifier. This may include, in some aspects, determining an order in which to apply the one or more re-fangers to the text string. For example, the re-fanging engine may be especially programmed to determine that application of a first re-fanger followed by a second re-fanger may be more likely to result in a resolvable URL than the reverse order (that is, applying the second re-fanger before the first re-fanger). In some aspects, this determining may include calculating a numerical score regarding the applicability of one or more re-fanging modules to the URL text string.

In some aspects, a computing device (e.g. threat analyst computing device 360) applying one or more re-fangers may result in a plurality of candidate re-fanged URLs. This may result, for example, if the de-fanged URL is ambiguous, or if the URL was ambiguously de-fanged. For example, a malicious website may be "http://www.iamabadwebsitedotcom.com." A user or automated de-fanging tool may not recognize that de-fanging the URL by replacing the dot delimiters with the text characters "DOT" will result in http://wwwDOTiamabadwebsitedotcomDOTcom will be ambiguous or encounter parsing difficulty, for example where a computing device applying a re-fanger which replaces DOT with (.) is case-insensitive. As such, multiple re-fanged candidates may be generated by the computing device. Some potential candidates for the present example may be: http://www.iamabadwebsite.com.com, http://www-DOTiamabadwebsiteDOTcom.com, and http://www.iamabadwebsitedotcom.com. These candidates may be scored, ranked, ordered or the like by the computing device. In some embodiments, a lookup using a domain name system (DNS) may be performed by the computing device to further score, rank, order, or the like.

As shown in FIG. 4A and FIG. 4B, in some aspects, re-fanging of one or more resource identifiers may be performed as one or more de-fanged resource identifiers are inputted into a text entry field 406. For example, the threat assessing user operating threat analyst computing device 360 which has received special instructions to generate user interface 400 might not need to navigate to or operate a separate web site, user interface, and/or application to re-fang the resource identifiers 401, 402, and/or 403. In other words, the re-fanging of the inputted one or more resource identifiers may occur without additional input from the user once the resource identifiers are inputted into text entry field 406. Rather, the computing device presenting the user interface may re-fang one or more resource identifiers as one or more de-fanged resource identifiers are inputted into a text entry field 406.

As illustrated in FIG. 4A and FIG. 4B, re-fanging a resource identifier may be performed as part of a threat identification and assessment process, for example by retrieving data from the resource identified. In some aspects, this process may include accessing the resource identified by a fanged or re-fanged resource identifier using a non-visible, non-displayed, and/or "headless" browser operable to retrieve data, such as HyperText Markup Language (HTML) data, Javascript, or other data which would be passed to an interactive and/or visible Internet browsing application. In some aspects, a computing device (e.g. threat analyst computing device 360) may determine that the resource identifier describes an accessible location, such as a website. In some aspects, as discussed above, the identifier may describe a non-accessing resource, such as an e-mail address, and accessing of the resource might not be appropriate.

As illustrated in user interface 400, additional inputs may be required and/or solicited from a user. For example, malicious resources may target users, individuals, organizations, or the like from one or more countries. As one example, users residing in the United States, Canada, and the United Kingdom may be targeted by a malicious resource with an origin in the United States and written to extract personal information from a user with prompts written in English. As another example, users in Canada and France may be targeted by a malicious resource with an origin in a different country (a country in Eastern Europe) and written to extract personal information from users with prompts written in French. In some aspects, a malicious entity may deploy a common "landing site" capable of determining a targeted user's geographic location (either automatically or responsive to input by the unsuspecting targeted user) to direct the targeted user to either the French malicious resource or the English malicious resource. A malicious entity may use such redirection tactics to decrease the level of suspicion, as the mimicked "real" resource may also use geo-identification and/or direction.

Accordingly, a threat assessment user manipulating a computing device through operation of user interface 400 (e.g., a user manipulating threat analyst computing device 360 alone or in combination with threat analysis computing platform 310) may input a geographic location, which may be used to direct one or more computing devices (e.g. analyzing module 317, safe crawling engine 318) to retrieve data from one or more geographic-specific resource locations. In some aspects, this input may be optional. In some aspects, the threat assessment user may input a geographic location (e.g. France) and the malicious entity might not have a malicious resource targeting users in the inputted geographic location (e.g. there might not be a malicious resource targeting France or using the French Language). In these and other aspects, the one or more computing devices directed to retrieve data from a non-existent geographically-specific resource location may retrieve data from another geographically-specific resource location and/or a non-geographically-specific resource location. In some aspects, the one or more computing devices may transmit a signal indicating the requested geographically-specific resource location was not found.

Another component of user interface 400 accessible to a threat assessment user manipulating the computing device through operation of user interface 400 may be an input for entry of an e-mail address or other address for delivery of any results regarding the threat assessment and/or analyzing process. FIG. 5 illustrates one example of results information 500 which may indicate one or more potential characteristics of the resource identifier inputted into the user interface 400, and/or data retrieved from the resource location, or the like. For example, results information 500 may include information about a time the resource was accessed, the amount of data retrieved from the resource, the IP address of the resource location, WHOIS or other data retrieved from third-party databases, whether the resource or similar resources have appeared on lists or in databases maintained by the institution, the threat analyzing user, a third party, or the like. Other data may be the checksum, MD5 hash, third-party classification, file type, or the like from a file or files downloaded from the resource. An antivirus application or applications may be used to analyze whether the retrieved data includes one or more computer viruses.

Information may be included in results information 500 based on one or more user-defined or determined settings, permissions, identities, or the like. For example, a threat assessment user may indicate a large number of information fields should be included in results information 500 to assist in categorization by a user and/or by one or more computing devices of a resource as malicious. As another example, a manager or supervisor may indicate different information fields should be included in a results information 500 delivered to the manager or supervisor than those of an analyst, perhaps because the manager or supervisor may be only interested in malicious binary or executable files.

In some aspects, categorization of the resource identifier and/or resource may occur based on the identifier and/or data retrieved from the location, or the like. The categorization may occur based on information included in a results information 500, or may occur on other data associated with the resource identifier and/or resource not included in results information 500. Categorization may occur for a single resource or identifier or for a group of resources and/or resource identifiers. For example, a de-fanged resource identifier of "hxxp://wwwDELETEME.badbadbadsite[.]com/fakeorderpage.php" may be inputted into user interface 400. The resource (e.g. the PHP page located at "http://www.badbadbadsite.com/fakeorderpage.php") and the URL (e.g. the re-fanged text string "http://www.badbadbadsite.com/fakeorderpage.php") may be categorized as malicious.

In some aspects, related resources and/or identifiers, or groupings of related resources and/or identifiers, may be also categorized as malicious. The computing device and/or computing system may categorize resources or identifiers as malicious even if the related resources and/or identifiers (or their de-fanged identifiers) were not input into the user interface 400 or accessed (e.g. by safe crawling engine 318). To continue the example, the identifier "http://www.badbadbadsite.com" may be categorized as malicious based on the categorization of the identifier "http://www.badbadbadsite.com/fakeorderpage.php", and the resource located at "http://www.badbadbadsite.com" may be categorized based on the categorization of the resource "http://www.badbadbadsite.com/fakeorderpage.php" Categorization of related resources and/or identifiers need not be limited to resource-based-on-resource or identifier-based-on-identifier, and resource-based-on-identifier or identifier-based-on-resource categorizations are also possible. As another example, if IP addresses "XXX.YY.ZZ.AAA" and "XXX.YY.ZZ.BBB" have been identified as malicious in a database (e.g. based upon entry of de-fanged resource identifiers "XXX[.]YY[.]ZZ[.]AAA" and "XXX[.]YY[.]ZZ[.]BBB" in one instance of operation of user interface 400, or in separate instances of operation of user interface 400). A resource identified with IP address "XXX.YY.ZZ.CCC" may be identified as malicious based on the related IP addresses. This may be, for example, based upon accessing a database or other data store to determine a relationship between resources at the three IP addresses XXX.YY.ZZ.AAA, XXX.YY.ZZ.BBB, and XXX.YY.ZZ.CCC. As another example, a computing device (e.g. threat analyst computing device 360) and/or a computing platform (e.g. threat analysis computing platform 31) may access a database or other data store to determine IPv6 addresses related to IPv4 addresses, or forward or reverse name lookups may be performed to determine corresponding domain name or IP addresses.

Figure 6:
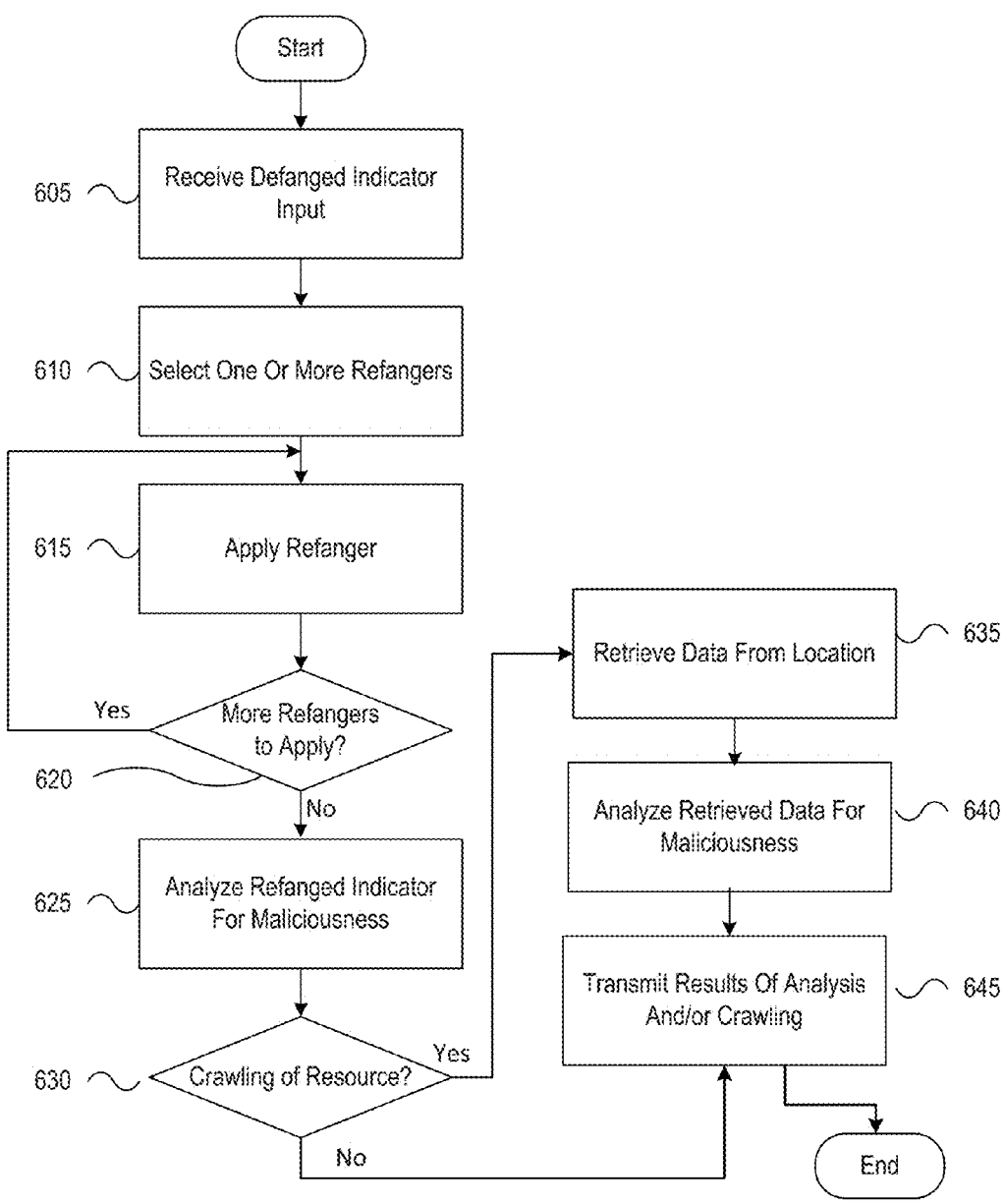
FIG. 6 depicts an illustrative method of classifying received identifiers and/or received data as potentially malicious in accordance with one or more example embodiments.

FIG. 6 depicts an illustrative method of classifying received identifiers and/or received data as potentially malicious in accordance with one or more example embodiments. Referring to FIG. 6, at step 605, a computing device (e.g., threat analyst computing device 360) and/or computing platform (e.g., threat analysis computing platform 310) may display a user interface and/or receive a de-fanged identifier as input. At step 610, the computing platform may select one or more re-fangers to apply to the de-fanged identifier. This may include one or more of the various selection techniques or methods discussed above. At step 615, the computing platform and/or computing device may apply one of the selected re-fangers. At step 620, the computing platform and/or computing device may determine if there are more re-fangers to apply or whether to apply one or more of the selected re-fanged identifiers. For example, the computing device and/or computing platform may determine at step 620 that further application of re-fangers might not be necessary, because the identifier may be determined to be resolvable, a fully qualified domain name (FQDN), a validly formed identifier, or the like. If it is determined that no additional re-fangers should be applied, or there are no additional re-fangers to apply, (Yes branch from step 620) the process may proceed to step 625. If there are more re-fangers to apply, or more re-fangers should be applied (No branch from step 620), the process may return to step 615. Additionally or alternatively, the process may determine at step 620 that application of the selected re-fangers, or further application of re-fangers, has not resulted in a resolvable or validly-formed identifier or will not result in a resolvable or validly-formed identifier. If so, the method may end at step 620. As discussed above, steps 605-620 may occur without further input, e.g. upon entry of the identifier in a user interface or upon receipt at the computing platform and/or computing device.

At step 625, the computing platform or computing device may analyze the re-fanged identifier for maliciousness. For example, this may be include one or more calls to applications and/or databases to identify, retrieve, associate, or the like the re-fanged identifier without necessarily accessing the resource identified by the identifier. As one example, the identifier may be an e-mail address, and accessing of the resource identified by the e-mail address might not be possible or likely to result in additional helpful information. However, if the e-mail address has previously been associated with transmission of malicious resources (e.g. the e-mail address is known to transmit "phishing" attacks), such association may be analyzed at step 625.

At step 630 it may be determined whether to access a location identified by the identifier. One example where it might not be necessary or appropriate is the e-mail example described above. Crawling of the resource might not be necessary or appropriate, and crawling of other resources associated with the resource also might not be necessary or appropriate. For example, the e-mail address may be analyzed at step 625 as originating from a freely-accessible e-mail provider operated by a reputable entity. Crawling of the reputable entity's accessible resources might not be necessary or appropriate, and analysis of the identifier may be limited to only the individual account and not the entire organization. As another example where accessing of the resource might not be necessary or appropriate, the identifier may be a URL previously known to be associated with a malicious entity, and further accessing of data from the resource may be unnecessary, dangerous, and/or less valuable than identification or analysis of unknown or not-previously-seen identifiers. Accordingly, accessing of the resource may not be performed (No branch from step 630) and the method may advance step 645.

If the resource should be accessed (Yes branch from step 630), data may be retrieved from the location identified by the re-fanged identifier at step 635. At step 640, this data may be analyzed for maliciousness. At step 645, the results of the analysis of the identifier and/or the data retrieved from the resource may be transmitted. For example, the computing device and/or computing platform may transmit this information to another computing device in the computing environment 300 (e.g. CSR computing device 340, customer computing device 320, one or more computing devices of other threat analyzing organizations 330). As another example, the computing device or computing platform may write the information to a database or data store for further access, retrieval, and/or manipulation by computing devices such as those of environment 300 or other devices. As another example, the computing device or computing platform may transmit an indication and/or a notification of the analysis or analyses of the resource and/or the identifier as malicious to a second computing device, a plurality of computing devices, a database, data store, or the like, and the second computing device, plurality of computing devices, database, data store, or the like may update a record or records stored locally or remotely to indicate that the resource and/or identifier has been determined to be malicious.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method comprising:

receiving, at a computing device and via a user interface, a string of text comprising a de-fanged uniform resource locator, wherein the de-fanged uniform resource locator includes a pair of brackets surrounding a dot (.);

converting, by the computing device, the de-fanged uniform resource locator into a resolvable uniform resource locator, wherein converting the de-fanged uniform resource locator into the resolvable uniform resource locator includes removing the pair of brackets;

retrieving, by the computing device, data from a network location identified by the resolvable uniform resource locator, wherein retrieving the data comprises instantiating a headless browser and rendering the data via the headless browser, resulting in rendered data;

categorizing, by the computing device, based on the rendered data, the location as a malicious location;

generating, by the computing device, one or more notifications based on the categorizing; and transmitting, by the computing device, the one or more notifications to another device to update a record stored at the another device and associated with the network location to include information indicating that the network location is malicious.

2. The method of claim 1, wherein the de-fanged uniform resource locator further includes an unknown protocol indicator and converting further includes replacing the unknown protocol indicator with a known protocol indicator.

3. The method of claim 2, wherein the known protocol indicator identifies a hypertext transport protocol (HTTP).

4. The method of claim 1, wherein categorizing the location comprises categorizing a domain name associated with the location.

5. The method of claim 1, further comprising:

retrieving, by the computing device, based on the data, geographic information associated with the network location, wherein categorizing the network location is based on the geographic information.

6. An apparatus comprising:

a processor; and one or more memories storing computer-readable instructions that, when executed by the processor, cause the processor to:

receive via a user interface a string of text that comprises a de-fanged uniform resource identifier (URI), wherein the de-fanged URI partially identifies a malicious location and wherein the de-fanged uniform resource locator includes a pair of brackets surrounding a dot (.);

convert the de-fanged URI into a re-fanged URI, wherein the re-fanged URI fully identifies the malicious location and wherein the re-fanged URI does not include the pair of brackets;

retrieve data from the malicious location identified by the re-fanged URI, wherein retrieving the data comprises operating a headless browser to render the data via the headless browser, resulting in rendered data;

categorize, by the computing device, based on the rendered data, the malicious location;

generate, by the computing device, one or more notifications based on the categorizing;

transmit, by the computing device, the one or more notifications to another device to update a record stored at the another device and associated with the network location to include information indicating that the network location is malicious.

7. The apparatus of claim 6, wherein the de-fanged URI further includes an unknown protocol indicator and the re-fanged URI further includes a known protocol indicator.

8. The apparatus of claim 7, wherein the known protocol indicator identifies a Hypertext Transport Protocol (HTTP).

9. The apparatus of claim 6, wherein the re-fanged URI includes a fully qualified domain name (FQDN).

10. The apparatus of claim 9, wherein categorizing the malicious location comprises categorizing the FQDN.

11. The apparatus of claim 6, wherein the re-fanged URI includes a uniform resource locator (URL).

12. One or more non-transitory computer readable media storing instructions that, when executed by a processor, cause the processor to:

receive via a user interface a string of text that comprises a de-fanged uniform resource identifier (URI) associated with a potentially malicious location, wherein the de-fanged URI includes a pair of brackets surrounding a dot (.);

convert the de-fanged URI into a clickable URI, wherein the clickable URI does not include the pair of brackets;

retrieve data from the malicious location identified by the clickable URI, wherein retrieving the data comprises launching a browser in a non-display mode to receive the data;

render the data, resulting in rendered data;

categorize, based on the rendered data, the malicious location;

generate one or more notifications based on the categorizing;

transmit, the one or more notifications to another device to update a record stored at the another device and associated with the network location to include information indicating that the network location is malicious.

13. The computer readable media of claim 12, wherein the de-fanged URI further includes an unknown protocol indicator and the clickable URI further includes a known protocol indicator.

14. The computer readable media of claim 13, wherein the known protocol indicator identifies a Hypertext Transport Protocol (HTTP).

* * * * *